United States Patent
Tang et al.

(10) Patent No.: US 9,436,834 B1
(45) Date of Patent: Sep. 6, 2016

(54) TECHNIQUES USING AN ENCRYPTION TIER PROPERTY IN A MULTI-TIERED STORAGE ENVIRONMENT

(71) Applicants: Xuan Tang, Hopkinton, MA (US); Qin Tao, Hopkinton, MA (US)

(72) Inventors: Xuan Tang, Hopkinton, MA (US); Qin Tao, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 287 days.

(21) Appl. No.: 13/690,069

(22) Filed: Nov. 30, 2012

(51) Int. Cl.
 *G06F 11/30* (2006.01)
 *G06F 21/60* (2013.01)

(52) U.S. Cl.
 CPC .................................. *G06F 21/602* (2013.01)

(58) Field of Classification Search
 CPC ........... G06F 2221/2107; G06F 3/062; G06F 3/0622; G06F 3/0623; G06F 3/0629; G06F 3/0646; G06F 3/0647; G06F 3/0649; G06F 3/0664; G06F 3/0665; G06F 3/0685; G06F 21/60; G06F 21/6218; G06F 21/78; G06F 21/80; G06F 21/805; G06F 21/10; H04L 67/1095; H04L 67/1097; H04L 63/20; H04L 63/08
 USPC ....................... 713/153, 164–166, 193; 726/1
 See application file for complete search history.

(56) References Cited

U.S. PATENT DOCUMENTS

| | | | | |
|---|---|---|---|---|
| 7,693,877 | B1* | 4/2010 | Zasman | 707/707 |
| 7,949,637 | B1* | 5/2011 | Burke | 707/655 |
| 8,756,687 | B1* | 6/2014 | Klein et al. | 726/22 |
| 2007/0271306 | A1* | 11/2007 | Brown et al. | 707/200 |
| 2010/0031062 | A1* | 2/2010 | Nishihara et al. | 713/193 |
| 2011/0119481 | A1* | 5/2011 | Auradkar et al. | 713/150 |
| 2012/0057407 | A1* | 3/2012 | Montgomery et al. | 365/185.17 |
| 2012/0144209 | A1* | 6/2012 | Kahler et al. | 713/193 |

OTHER PUBLICATIONS

U.S. Appl. No. 13/466,775, filed May 8, 2012, Performing Data Storage Optimizations Across Multiple Data Storage Systems.

* cited by examiner

Primary Examiner — Ali Abyaneh
(74) *Attorney, Agent, or Firm* — Muirhead and Saturnelli, LLC

(57) ABSTRACT

Techniques are described for storing data. A plurality of storage tiers are provided including a first set and a second set of storage tiers of physical devices. Data stored on any physical device in the first set is stored in an encrypted form. Data stored on any physical device in the second set is not stored in an encrypted form. A first value is specified for a first setting that is any of a tiering preference and tiering requirement indicating that at least one data portion of a logical device is to be stored on physical device(s) of a storage tier storing data in an encrypted form. Responsive to specifying the first value as the first setting, the at least one data portion of the logical device currently stored on physical device(s) of the second set are relocated to physical device(s) of the first set.

18 Claims, 9 Drawing Sheets

| LUN | Tiering preference(s) | Tiering requirement(s) | Encrypted status |
|---|---|---|---|
| A | EFD | encryption/ SED | 0 |
| B | FC | encryption/SED | 1 |
| C | no encryption/non-SED | EFD | 0 |
| D | encryption/SED | EFD | 1 |

FIG. 4

| LUN, portion | Tiering preference(s) | Tiering requirement(s) | Encryption status |
|---|---|---|---|
| A, P1 | EFD | encryption/SED | 0 |
| A, P2 | FC | encryption/SED | 1 |
| A, P3 | no encryption/non-SED | EFD | 0 |

FIG. 5

TECHNIQUES USING AN ENCRYPTION TIER PROPERTY IN A MULTI-TIERED STORAGE ENVIRONMENT

BACKGROUND

1. Technical Field

This application generally relates to data storage, and more particularly to techniques used in connection with determining and performing data movements in a multi-tiered storage environment.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices, or logical volumes (LVs). The logical disk units may or may not correspond to the actual disk drives. Allowing multiple host systems to access the single storage device unit allows the host systems to share data stored therein.

In connection with data storage, a variety of different technologies may be used. Data may be stored, for example, on different types of disk devices and/or flash memory devices. The data storage environment may define multiple storage tiers in which each tier includes physical devices or drives of varying technologies, performance characteristics, and the like. The physical devices of a data storage system, such as a data storage array, may be used to store data for multiple applications.

SUMMARY OF THE INVENTION

In accordance with one aspect of the invention is a method of storing data comprising: providing a plurality of storage tiers including a first set of one or more storage tiers of physical devices and a second set of one or more storage tiers of physical devices, wherein data stored on any physical device in the first set is stored in an encrypted form and data stored on any physical device in the second set is not stored in an encrypted form; specifying a first value for a first setting that is any of a tiering preference and tiering requirement indicating that at least one data portion of a logical device is to be stored on one or more physical devices of a storage tier that stores data in an encrypted form; and responsive to specifying said first value as the first setting, relocating the at least one data portion of the logical device currently stored on one or more physical devices of the second set to one or more physical devices of the first set. The storage devices of the first set may be self encrypting drives providing for automatic encryption of data written to any of the physical devices of the first set and automatic decryption of data read from any of the physical devices of the first set. The method may also include modifying the first setting from the first value to a second value indicating that the at least one data portion of the logical device is to be stored on physical devices of a storage tier that does not store data in an encrypted form; and responsive to specifying said second value as the first setting, relocating the at least one data portion of the logical device currently stored on one or more physical devices of the first set to one or more physical devices of the second set. The first set of storage tiers may include a first storage tier of physical devices and a third storage tier of physical devices, and wherein the second set may include a second storage tier of physical devices and a fourth storage tier of physical devices. The physical devices of the first storage tier may be ranked as higher performing than physical devices of the third storage tier and wherein the physical devices of the second storage tier may be ranked as higher performing than physical devices of the fourth storage tier. A third value for a second setting may be specified that is any of a tiering preference and tiering requirement indicating that the at least one data portion of the logical device may be stored on one or more physical devices of a storage tier having a particular physical drive type. The step of relocating may select one or more storage tiers in the first set in accordance with the first value of the first setting and the third value of the second setting. Responsive to specifying the first value for the first setting, the step of relocating may relocate the at least one data portion of the logical device currently stored on one or more physical devices of any of the second storage tier and the fourth storage tier to one or more physical devices included in any of the first storage tier and the third storage tier. The step of relocating may move a set of data portions of the logical device to any of the first storage tier and the third storage tier wherein each of the data portions in the set may be moved to a selected one of the first and third storage tiers in accordance with a current level of activity or workload associated with said each data portion. First and second data portions of the logical device may be included in the set of data portions and may be currently stored on one or more physical devices of the second storage tier. The first data portion of the logical device may have a higher level of activity than the second data portion of the logical device, and wherein said relocating may move the first data portion to the first storage tier and the second data portion to the third storage tier. At a subsequent point in time the first data portion of the logical device may have a lower level of activity than the second data portion of the logical device, and wherein, in accordance with the subsequent point in time, the first data portion may be moved to the third storage tier and the second data portion may be moved to the first storage tier as part of a data storage movement optimization. Each of the plurality of storage tiers may be associated with a set of one or more properties including a first property identifying whether physical devices of said each tier are self encrypting drives. The set of one or more properties may include a second property identifying a physical drive type. The first setting may be associated with a set of one or more data portions of the logical device which are relocated from physical devices of the first set to physical devices of the second set. A status indicator may be set to indicate that the set of one or more data portions are stored in an encrypted form responsive to completing relocation of the set of data portions to the first set of one or more storage tiers of physical devices. The method may also include modifying the first setting from the first value to a second value indicating that the at least one data portion of the logical device is to be stored on physical devices of a storage tier that does not store data in an encrypted form; and responsive to specifying said second value for the first setting, relocating the at least one data portion of the logical device currently stored on one or more physical devices of any of the first storage tier and the third storage tier to one or more physical devices of any of the second storage tier and the fourth storage tier. The first setting may be associated with an entire logical address range of the logical device. An entire logical address range of the logical device may be partitioned into a plurality of data portions each associated with an instance of the first setting that is any of a tiering preference and tiering requirement identifying whether data of said each data portion is stored on one or more physical devices of a storage tier which stores data in an encrypted form. One or more control parameters may be specified which affect any of a processing rate, amount of time and priority associated with performing said relocating.

In accordance with another aspect of the invention is a system comprising: a plurality of storage tiers including a first set of one or more storage tiers of physical devices and a second set of one or more storage tiers of physical devices, wherein data stored on any physical device in the first set is stored in an encrypted form and data stored on any physical device in the second set is not stored in an encrypted form; a plurality of logical devices, wherein a first setting identifying any of a tiering preference and a tiering requirement is specified for each of said logical devices indicating whether at least one data portion of a logical device is to be stored on one or more physical devices of a storage tier that stores data in an encrypted form; and a computer readable medium comprising code of a data movement module that moves data of the plurality of logical devices between different ones of the plurality of tiers in accordance with criteria including said first setting for each of the logical devices. At least one of the plurality of logical devices may have a second setting that is any of a tiering preference and a tiering requirement identifying a physical drive characteristic or type of physical drive, and wherein the criteria used by the data movement module may include the second setting. The data movement module may perform data movement of data portions of the plurality of logical devices among the plurality of storage tiers in accordance with criteria including the first setting for each of the logical devices and workload or activity associated with each of the data portions of the plurality of logical devices.

In accordance with another aspect of the invention is a computer readable medium comprising code stored thereon for storing data, the computer readable medium comprising code for: providing a plurality of storage tiers including a first set of one or more storage tiers of physical devices and a second set of one or more storage tiers of physical devices, wherein data stored on any physical device in the first set is stored in an encrypted form and data stored on any physical device in the second set is not stored in an encrypted form; specifying a first value for a first setting that is any of a tiering preference and tiering requirement indicating that at least one data portion of a logical device is to be stored on one or more physical devices of a storage tier that stores data in an encrypted form; and responsive to specifying said first value as the first setting, relocating the at least one data portion of the logical device currently stored on one or more physical devices of the second set to one or more physical devices of the first set, wherein the storage devices of the first set are self encrypting drives providing for automatic encryption of data written to any of the physical devices of the first set and automatic decryption of data read from any of the physical devices of the first set.

BRIEF DESCRIPTION OF THE DRAWINGS

Features and advantages of the present invention will become more apparent from the following detailed description of exemplary embodiments thereof taken in conjunction with the accompanying drawings in which:

FIGS. 4-5 are examples of tiering preferences, tiering requirements and encryption status indicators that may be specified for LUNs and data portions of LUNs in an embodiment in accordance with techniques herein.

DETAILED DESCRIPTION OF EMBODIMENT(S)

Figure 1:
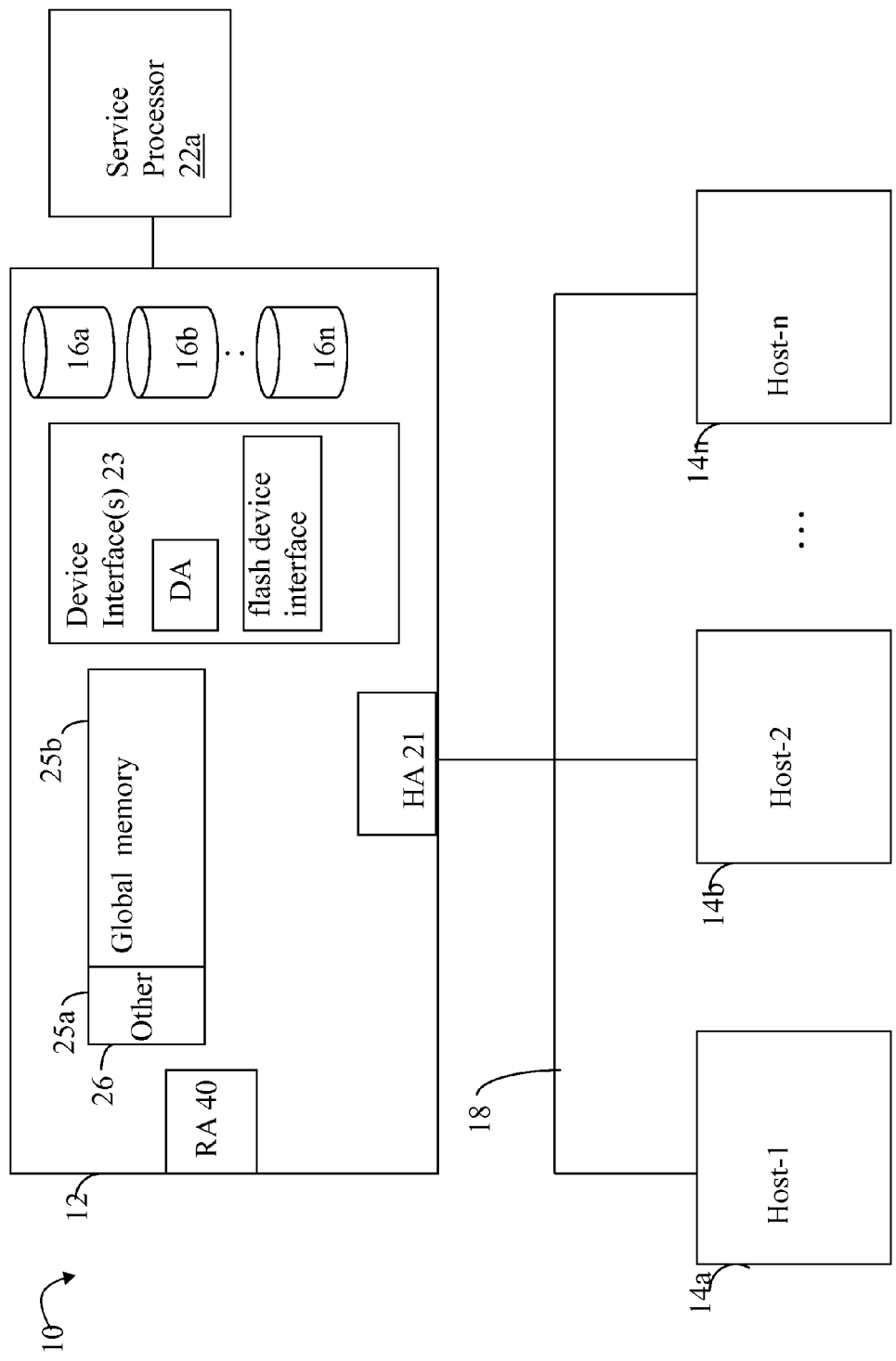
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although following paragraphs may make reference to a particular type such as a flash device or flash memory device.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical units (LUNs), or logical volumes (LVs). The LVs may or may not correspond to the actual physical devices or drives 16a-16n. For example, one or more LVs may reside on a single physical drive or multiple drives. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LV(s) residing thereon. A flash device interface may be another type of device interface used in connection with facilitating data transfers to/from the associated flash devices and LV(s) residing thereon. It should be noted that an embodiment may use the same or a different device interface for one or more different types of devices than as described herein.

The device interface, such as a DA, performs I/O operations on a drive 16a-16n. In the following description, data residing on an LV may be accessed by the device interface following a data request in connection with I/O operations that other directors originate. Data may be accessed by LV in which a single device interface manages data requests in connection with the different one or more LVs that may reside on a drive 16a-16n. For example, a device interface may be a DA that accomplishes the foregoing by creating job records for the different LVs associated with a particular device. These different job records may be associated with the different LVs in a data structure stored and managed by each device interface.

Also shown in FIG. 1 is a service processor 22a that may be used to manage and monitor the system 12. In one embodiment, the service processor 22a may be used in collecting performance data, for example, regarding the I/O performance in connection with data storage system 12. This performance data may relate to, for example, performance measurements in connection with a data request as may be made from the different host computer systems 14a 14n. This performance data may be gathered and stored in a storage area.

It should be noted that a service processor 22a may exist external to the data storage system 12 and may communicate with the data storage system 12 using any one of a variety of communication connections. In one embodiment, the service processor 22a may communicate with the data storage system 12 through three different connections, a serial port, a parallel port and using a network interface card, for example, with an Ethernet connection. Using the Ethernet connection, for example, a service processor may communicate directly with DAs and HAs within the data storage system 12.

With reference to FIG. 1, components of the data storage system may communicate using GM 25b. For example, in connection with a write operation, an embodiment may first store the data in cache included in a portion of GM 25b, mark the cache slot including the write operation data as write pending (WP), and then later destage the WP data from cache to one of the devices 16a-16n. In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

As described above, the data storage system 12 may be a data storage array including a plurality of data storage devices 16a-16n in which one or more of the devices 16a-16n are flash memory devices employing one or more different flash memory technologies. In one embodiment, the data storage system 12 may be aVNX™ data storage array or system by EMC Corporation of Hopkinton, Mass. In the foregoing data storage array, the data storage devices 16a-16n may include a combination of disk devices and flash-based (or SSD-based) physical storage devices where the flash devices may appear as standard Fibre Channel (FC) drives to the various software tools used in connection with the data storage array. The flash devices may be constructed using nonvolatile semiconductor NAND flash memory. The flash devices may include one or more SLC (single level cell) devices and/or MLC (multi level cell) devices.

It should be noted that the techniques herein may be used in connection with flash devices comprising what may be characterized as enterprise-grade or enterprise-class flash drives (EFDs) with an expected lifetime (e.g., as measured in an amount of actual elapsed time such as a number of years, months, and/or days) based on a number of guaranteed write cycles, or program cycles, and a rate or frequency at which the writes are performed. Thus, a flash device may be expected to have a usage measured in calendar or wall clock elapsed time based on the amount of time it takes to perform the number of guaranteed write cycles. The techniques herein may also be used with other flash devices, more generally referred to as non-enterprise class flash devices, which, when performing writes at a same rate as for enterprise class drives, may have a lower expected lifetime based on a lower number of guaranteed write cycles.

The techniques herein may be generally used in connection with any type of flash device, or more generally, any SSD technology. The flash device may be, for example, a flash device which is a NAND gate flash device, NOR gate flash device, flash device that uses SLC or MLC technology, and the like, as known in the art. In one embodiment, the one or more flash devices may include MLC flash memory devices although an embodiment may utilize MLC, alone or in combination with, other types of flash memory devices or other suitable memory and data storage technologies. More generally, the techniques herein may be used in connection with other SSD technologies although particular flash memory technologies may be described herein for purposes of illustration.

An embodiment in accordance with techniques herein may have one or more defined storage tiers. Each tier may generally include physical storage devices or drives having one or more attributes associated with a definition for that tier. For example, one embodiment may provide a tier definition based on a set of one or more attributes or properties. The attributes may include any one or more of a storage type or storage technology, device performance characteristic(s), RAID configuration (e.g., RAID-0, RAID-1, RAID-5, RAID-6), storage capacity, and the like. The storage type or technology may specify whether a physical storage device is an SSD drive (such as a flash drive), a particular type of SSD drive (such using flash or a form of RAM), a type of rotating magnetic disk or other non-SSD drive (such as an FC disk drive, a 10K RPM FC disk drive, a 15K RPM FC disk drive, a SATA (Serial Advanced Technology Attachment) drive), SAS (Serial Attached SCSI), and the like. Performance characteristics may relate to different performance aspects of the physical storage devices of a particular type or technology. For example, there may be multiple types of FC disk drives based on the RPM characteristics of the FC disk drives (e.g., 10K RPM FC drives and 15K RPM FC drives) and FC disk drives having different RPM characteristics may be included in different storage tiers. Storage capacity may specify the amount of data, such as in bytes, that may be stored on the drives. An embodiment may define one or more such storage tiers. For example, an embodiment in accordance with techniques herein may define two storage tiers including a first tier of all SSD drives and a second tier of all non-SSD drives. As another example, an embodiment in accordance with techniques herein may define three storage tiers including a first tier of all SSD drives which are flash drives, a second tier of all FC drives, and a third tier of all SATA drives. In terms of general expected performance, the SSD or flash tier may be considered the highest performing tier. The FC drives may be considered the second or next highest performing tier and the SATA drives may be considered the lowest or third ranked tier in terms of expected performance.

The foregoing are some examples of tier definitions and other tier definitions may be specified in accordance with techniques herein.

In accordance with techniques herein, a tier definition for physical devices may include an attribute which identifies whether the physical devices of the storage tier store data in an encrypted form. An embodiment in accordance with techniques herein may include one or more storage tiers of self encrypting drives (SEDs) described in more detail below and also known in the art. A storage tier including SEDs may accordingly have an attribute setting of SED or encryption denoting that the physical drives of the tier store data in an encrypted form. A storage tier attribute such as SED indicating whether a storage tier includes drives which store data in an encrypted form may be included in a set of one or more attributes specified for each storage tier. In other words, an embodiment in accordance with techniques herein may include a set of one or more attributes for each storage tier including an attribute such as SED which indicates whether physical drives of the tier store data in an encrypted form. The SED attribute for a storage tier may be included with one or more additional attributes characterizing physical devices of the storage tier. An embodiment may use an SED drive, such as a commercially available SED drive by Seagate.

As described in more detail herein, the SED attribute or property as may be associated with a storage tier may denote whether physical devices of the tier provide "data at rest encryption" whereby encryption may be provided, for example, by hardware-based, on array, back-end encryption. More generally, the SED attribute for a storage tier may identify whether data stored on physical devices of the storage tier is in an encrypted form.

An SED drive may be characterized in that it has self encryption capabilities whereby data written to an SED drive is stored on the SED drive in an encrypted form. Also, the SED may include data decryption capabilities so that when data stored in its encrypted form on the SED drive is read, the encrypted data is then automatically decrypted prior to be being provided for subsequent use, such as to service a read request from a host. Some embodiments may use an SED drive in which the encrypting and decrypting functionality may be enabled through use of authentication or security related data which is provided when the SED drive is installed as a physical device for use in a data storage system. The data storage system may provide such authentication or security related data unique to each SED drive (such as part of SED and/or data storage system installation) to enable the SED drive to perform the encryption when writing data and decryption when reading data from the SED drive. If an SED is installed for use on a data storage system and such authentication or security related data is not provided, any encrypted data currently stored on the SED would not be decrypted such as in connection with reading data from the SED. In this manner, if the SED is lost or stolen, an unauthorized party is unable to read any encrypted data stored on the SED without also providing the authentication or security related data for that particular SED.

An embodiment in accordance with techniques herein may include a data storage system, such as a single data storage array, in which the system includes both SED and non-SED drives. In this manner, the encryption/decryption functionality of the SED drives to store data on the physical devices in an encrypted form may be treated as attribute or property of a storage tier in a similar manner to which other drive attributes or properties (e.g., drive technology and other performance characteristics) may be used in forming storage tiers.

SED drives may be used, for example, for storing sensitive or confidential data such as may be needed in connection with security regulations, for data theft prevention, and the like. As such, in some embodiments, not all data may need to be stored on SEDs but only selected sets of data. For example, a data storage system may store data for both a finance department and engineering department. Some or all data of the finance department may need to be stored on SEDs due to its sensitive nature for regulatory compliance. In contrast, none of the engineering data may need to be stored on SEDs and therefore stored on non-SED drives.

An SED drive may be a drive having any suitable storage technology, such as SSD (e.g., such as a flash-based storage) or non-SSD (e.g., FC, SATA, and the like). Thus, an embodiment may define a storage tier having the SED attribute in combination with one or more other attributes denoting the drive technology, drive performance characteristics, and the like. In accordance with techniques herein, one or more tiers may be defined comprising SEDs. Such SED-based tier(s) may be defined in combination with one or more non-SED-based tiers. In this manner, a drive may be characterized as having an encryption property denoting whether the physical drive is an SED or not, or more generally, denoting whether data stored on the physical devices of the tier are stored in an encrypted form. An embodiment may define a storage tier which includes drives based on encryption property alone, or in combination with, other properties. For example, an embodiment may define a single tier of all physical devices which are SEDs thereby having the encryption property independent of any other drive property. An embodiment may also define multiple storage tiers of SEDs where the encryption property in combination with one or more other properties (e.g. such a drive technology or performance characteristics) are used to characterize drives of a particular tier. For example, an embodiment may have the following tiers: a first tier of EFD drives which are non-SED drives, a second tier of EFD drives which are SEDs, a third tier of FC drives (rotating disk drives) which are non-SED drives and a fourth tier of FC drives which are SED drives.

A storage pool may be defined as a logical group of physical devices. In an embodiment in accordance with techniques herein, a logical device or unit, such as a LUN, may be configured from physical devices of a storage pool. A storage pool may be heterogeneous including multiple different tiers of physical devices. One or more LUNs may be created from a single storage pool whereby different data portions of a single LUN may be located on different physical devices of the pool. Furthermore, such different data portions of the single LUN may be stored on different physical devices of different storage tiers as described in more detail in following paragraphs. A LUN or other logical device having storage provisioned from a storage pool may be any suitable type of logical device or entity supported in an embodiment. For example, a LUN may be a thin or virtually provisioned LUN, a thick or regular LUN, and the like. Generally, a thick or regular LUN may have storage provisioned for the entire LUN's capacity when the LUN is created. In other words, storage may be allocated from the pool for the LUN's entire logical address space when the LUN is created. In contrast, thin or virtually provisioned (VP) LUNs use a capacity on demand model whereby storage may not be provisioned for the entire LUN's address space when the LUN is created. Rather, storage may be provisioned for a portion of the LUN's address space when there is an initial write to the logical address space. The granularity or the amount of storage provisioned at a time for virtually provisioned LUN may vary with embodiment. Thus, at any point in time, not all portions of the logical address space of a virtually provisioned device may be associated or mapped to allocated physical storage depending on which logical addresses of the virtually provisioned LUN have been written to at a point in time.

Figure 2:
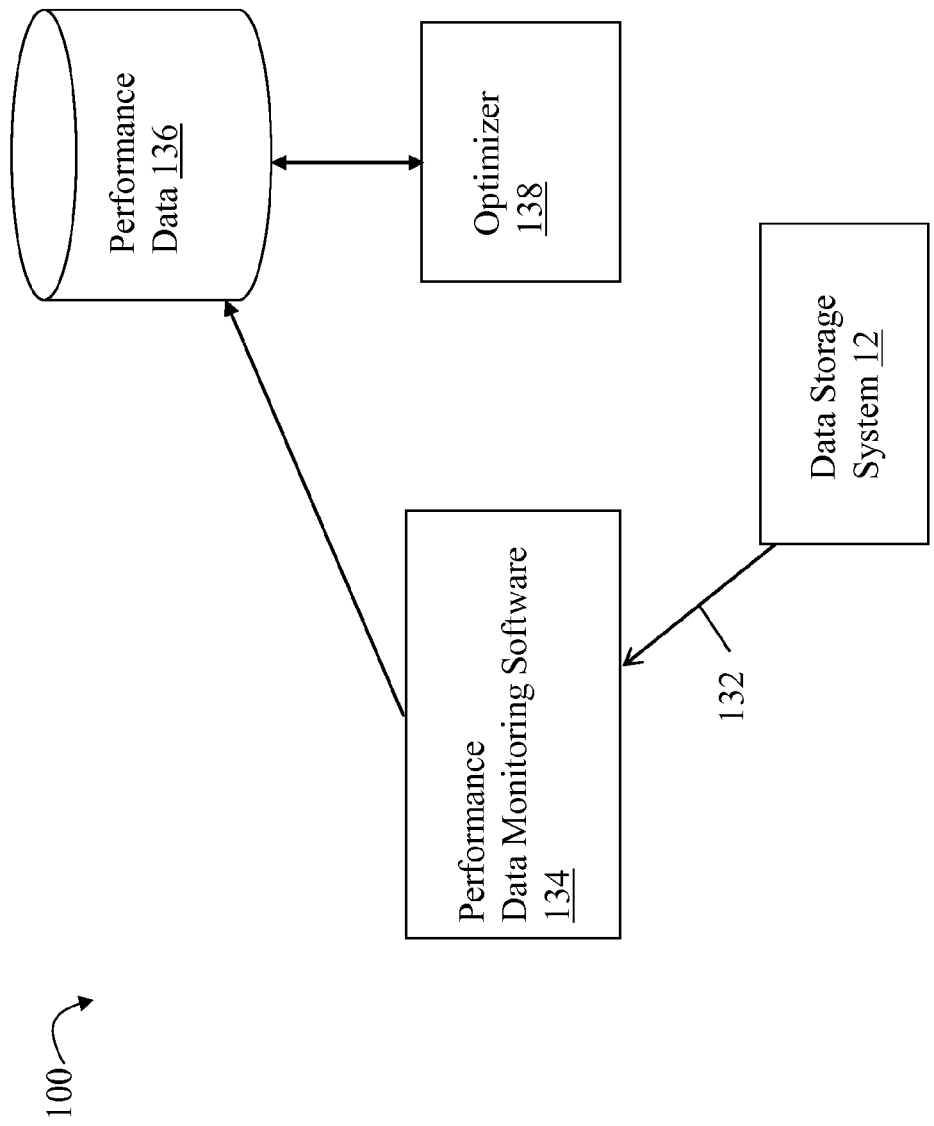
FIG. 2 is an example of components that may be used in connection with perform data movements in an embodiment in accordance with techniques herein.

Referring to FIG. 2, shown is an example 100 of software that may be used in connection with techniques herein. One or more of the components and associated functionality illustrated in FIG. 2 may be located on the service processor 22a, data storage system and/or embodied in any other suitable physical component(s). It should be noted that the service processor may be any one of a variety of commercially available processors, such as an Intel-based processor, and the like. For example, elements 134, 138 and 136 may be included in the service processor 22a in one embodiment.

The example 100 includes performance data monitoring software 134 which gathers performance data 136 about the data storage system 12 through the connection 132. The performance data monitoring software 134 gathers and stores performance data 136 which is input to the optimizer 138. This performance data 136 may serve as an input to the optimizer 138 which attempts to enhance the performance of I/O operations, such as those I/O operations associated with data storage devices 16a-16n of the system 12. The optimizer 138 may take into consideration various types of parameters and performance data 136 in an attempt to optimize particular metrics associated with performance of the data storage system 12. The performance data 136 may be used by the optimizer to determine metrics characterizing the workload or activity of data portions as may be used in an embodiment in accordance with techniques herein. The optimizer may access the performance data, for example, collected for a plurality of logical devices when performing a data storage optimization. The performance data 136 may be used in determining a workload for one or more physical devices, logical devices (e.g., LVs or LUNs), portions of logical devices (e.g., gather performance data and determine workload or level of activity for granularity that is less than an entire logical device), and the like. For example, in one embodiment, the data storage optimizer may perform data movement optimization based on the dynamically changing workload of data portions which are 1 GB slices or data portions. In this manner, the optimizer may determine workload for each such slice (slice-level granularity) and may perform data movement in slice units or other suitable size granularity. The workload may also be a measurement or activity level of "how busy" a device (or data portion thereof) is, for example, in terms of I/O operations (e.g., I/O throughput such as number of I/Os/second, response time (RT), average data transfer rate (e.g., bytes/second), and the like).

The response time for a storage device or volume may be based on a response time associated with the storage device or volume for a period of time. The response time may be based on read and write operations directed to the storage device or volume. Response time represents the amount of time it takes the storage system to complete an I/O request (e.g., a read or write request). Response time may be characterized as including two components: service time and wait time. Service time is the actual amount of time spent servicing or completing an I/O request after receiving the request from a host via an HA 21, or after the storage system 12 generates the I/O request internally. The wait time is the amount of time the I/O request spends waiting in line or queue waiting for service (e.g., prior to executing the I/O operation).

It should be noted that the operations of read and write with respect to a logical or physical device may be viewed as read and write requests or commands from the DA 23, controller or other backend physical device interface. Thus, these are operations may also be characterized as a number of operations with respect to the physical storage device (e.g., number of physical device reads, writes, and the like, based on physical device accesses). This is in contrast to observing or counting a number of particular types of I/O requests (e.g., reads or writes) as issued from the host and received by a front end component such as an HA 21. To illustrate, a host read request may not result in a read request or command issued to the DA if there is a cache hit and the requested data is in cache. The host read request results in a read request or command issued to the DA 23 to retrieve data from the physical drive only if there is a read miss. Furthermore, when writing data of a received host I/O request to the physical device, the host write request may result in multiple reads and/or writes by the DA 23 in addition to writing out the host or user data of the request. For example, if the data storage system implements a RAID data protection technique, such as RAID-5, additional reads and writes may be performed such as in connection with writing out additional parity information for the user data. Thus, observed data gathered to determine workload, such as observed numbers of reads and writes, may refer to the read and write requests or commands performed by the DA. Such read and write commands may correspond, respectively, to physical device accesses such as disk reads and writes that may result from a host I/O request received by an HA 21.

The optimizer 138 may perform processing to determine which data portions of one or more applications to locate on physical storage devices in a multi-tiered environment. It should be noted that the optimizer 138 may generally represent one or more components that perform processing as described herein as well as one or more other optimizations and other processing that may be performed in an embodiment. The optimizer 138 may, more generally, be referred to as a data movement module which provides for movement of data between storage tiers in accordance with data movement criteria. Generally, the optimizer may locate the most active data portions in the highest performance tiers and the less active data to lower performance tiers. As the activity or workload of data portions change over time, the optimizer may gather updated performance data reflecting such changes in workload and accordingly relocate data portions as needed based on such workload changes. For example, at a first point in time, a first data portion may have a first workload or activity level which is higher than a second workload or activity level of a second data portion. At the first point in time, the optimizer may locate the first data portion on an EFD tier and the second data portion on a lower performing FC or SATA tier. At a second later point in time, the workload of both the first and second data portions may change so that the first data portion now has approximately the second workload or activity and the second data portion has approximately the higher first workload or activity. At the second point in time, the optimizer may perform a data movement optimization based on this change in workload and move or relocate the first data portion to the FC or SATA tier and also move or relocate the second data portion to the EFD tier.

Thus, generally, the optimizer may gather data or statistics providing a measure of the activity or workload of a data portion. The optimizer may collect such data and perform analysis of the workload or activity of the data portions at various points in time, such as once per hour, to determine a ranking of the data portions in terms of activity relative to other data portions (for the same and different LUNs) of the pool. The data storage optimizer may provide for automatic relocation and data movement of data portions to different storage tiers in the pool based on data movement criteria and policies that may be included in an embodiment. For example, a policy option of automated tiering may be specified on a per LUN basis so that data portions of the LUN are located to different storage tiers based on the foregoing activity ranking. For example, the "hottest" or most active portions of the LUN having the highest workload are located in the highest performing available tier while placing portions of the LUN with lower activity on the lower performing tiers. The foregoing is one such policy that may be in effect for a LUN as may be included in an embodiment. It should be noted that an embodiment may also include one or more other policy options that may be specified for each LUN affecting where data of the LUN is located or placed. An embodiment may use a data storage optimizer such as, for example, EMC® Fully Automated Storage and Tiering for Virtual Pools (FAST VP) by EMC Corporation, providing functionality as described herein for such automated evaluation and data movement optimizations. For example, different techniques that may be used in connection with the data storage optimizer are described in U.S. patent application Ser. No. 13/466,775, filed May 8, 2012, PERFORMING DATA STORAGE OPTIMIZATIONS ACROSS MULTIPLE DATA STORAGE SYSTEMS, which is incorporated by reference herein.

Data portions of a LUN may be initially placed or located in a storage tier based on an initial placement or allocation policy. Subsequently, as data operations are performed with respect to the different data portions and data collected, data portions may be automatically relocated or placed in different storage tiers having different performance characteristics as the observed workload or activity of the data portions change over time.

Thus, the data storage optimizer may move or relocate data portions between different storage tiers having particular performance characteristics based on the activity of the data portions. In a similar manner, the data storage optimizer, or more generally a data movement or relocation module, may also move or relocate data portions between different storage tiers (each of which are identified as having or not having the encryption property) based on whether the data portions need to be stored in an encrypted form. In other words, if the data portion needs to be stored in an encrypted form, the data portion is placed on one or more physical devices included in a tier identified as having the SED property. Otherwise, the data portion is placed on one or more physical devices of storage tiers indicated as non-SED. The data movement module may perform processing to determine in which storage tier to locate data portions based on criteria including whether the data needs to be stored in an encrypted form or not. The criteria may also include performing data movements between different storage tiers based on activity level of the data portions at different points in time. It should be noted that although examples may be provided in which the criteria used to determine what storage tier to locate or place a data portion may include both of the foregoing. However, the techniques herein may more generally be performed in an embodiment in which the criteria used to determine appropriate storage tiers for data portions may include whether the data needs to be stored in an encrypted form alone, or optionally in combination with one or more other criteria such as based on activity or workload (e.g., whereby the most active are stored in the highest performing tiers).

Figure 3A:
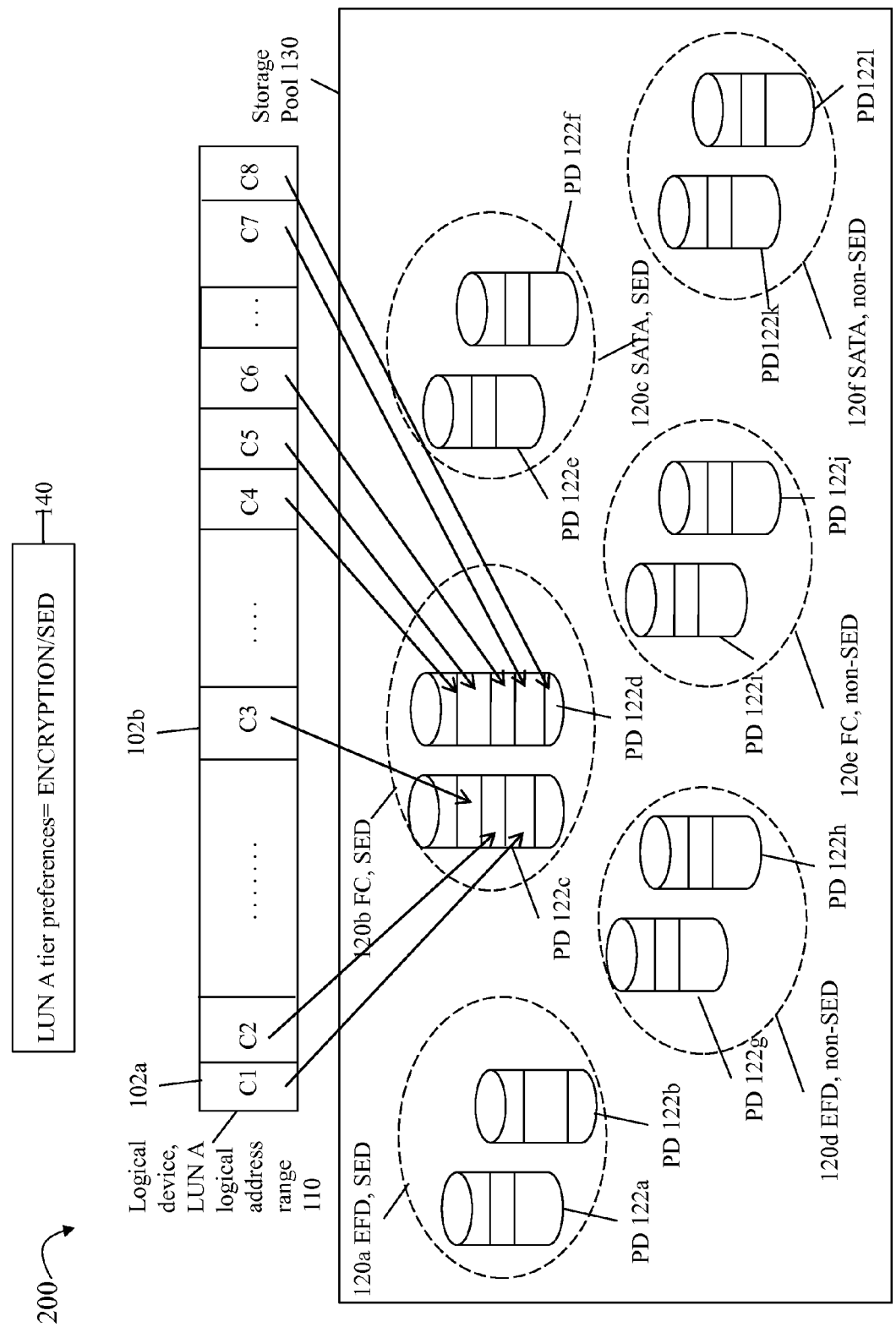
FIGS. 3A, 3B and 3C are examples illustrating use of techniques herein for performing data movement between encrypted/SED and non-SED-based/non-encrypted tiers in an embodiment in accordance with techniques herein.

Referring to FIG. 3A, shown is an example of a storage pool including a plurality of storage tiers as may be used in connection with techniques herein. The example 200 includes a storage pool 130 including physical devices (PDs) 122a-122l of 6 different storage tiers 120a-120f. In this example, each storage tier may be characterized by multiple attributes or properties including a first attribute denoting whether the storage tier comprises SED drives, or more generally denoting whether data is stored in encrypted form on physical devices of the tier. The multiple attributes of each tier also include a second attribute denoting the drive type or technology as one of EFD, FC or SATA.

In this example, the 6 storage tiers in the pool 130 may include: tier 120a of EF, SED physical devices (PDs) 122a-b, tier 120b of FC, SED PDs 122c-d, tier 120c of SATA, SED PDs 122e-f, tier 120d of EFD, non-SED PDs 122g-h, tier 120e of FC, non-SED PDs 122i-j and tier 120f of SATA, non-SED PDs 122k-l.

Element 110 may represent a logical address range of a logical device, such as a LUN A, configured from the pool 130 denoting where different portions of data of the logical address range are physical stored on devices in the storage pool 130. Each of the square units or elements, such as 102a and 102b, included in 110 may denote a data portion, such as a slice or other appropriately sized portion of the logical address space of LUN A. LUN A may be a thick or virtually provisioned device. If LUN A is a thick device, each portion of the logical address space 110 may be mapped to a portion of physical storage. If LUN A is a virtually provisioned device, each portion of the logical address space 110 may or may not be mapped to a portion of physical storage depending on whether any data has been stored or written to the logical address space portions. For purposes of illustration, assume that LUN A is a thick LUN having storage allocated for all its data portions from a default tier such as the non-SED SATA tier data portions even though such mapping is only denoted for some particular data portions denoted C1-C8.

Element 140 may indicate one or more tiering preference settings for the LUN. In this example, tiering preferences indicating that data portions of the LUN are to be stored on SED tiers, or more generally, stored in tiers which store data in an encrypted form. More generally, a tiering preference for storing data portions of the LUN may be specified where the preference may be denote one or more preferred properties of a storage tier where data portions of the LUN are stored. In one embodiment the preferences may denote, for example, desired performance characteristics, drive technology (e.g., SSD or rotating disk), drive type (e.g., SATA, EFD, FC) and may also identify whether it is preferred to store data portions of the LUN on an SED where the data portions are thereby stored in encrypted form on the drive. In this example of FIG. 3A, only the encryption SED preference is indicated. The particular tier to which each portion of the LUN A's logical address space is initially mapped may be specified, for example, using a configuration default, using another policy setting, and the like.

Element 140 may represent a tiering preference specified on a per LUN basis when the LUN is created so that, for example, storage may be initially provisioned from a default storage tier having the SED or encryption attribute set. Initially, data portions of the LUN A may be allocated from a default tier having the SED property, such as tier 120b

(SED, FC). It should be noted that all portions of 110 may be initially mapped to physical storage in tier 120b although such mapping is only illustrated for portions C1-C8 for simplicity in illustration.

It should also be noted that although this example illustrates only a single LUN A having storage allocated from the pool 130, multiple LUNs may simultaneously have their physical storage similarly allocated from the same PDs of the same storage pool 130.

Thus, FIG. 3A may represent a mapping of where data portions corresponding to the LUN A's logical address space are located (e.g., in what storage devices of what storage tiers) at a first point in time.

After a time period, information regarding the activity or workload of the data portions of LUN A may be obtained based on gathered data as described elsewhere herein. Based on the activity or workload of the data portions, the data portion may be relocated or moved to a different storage tier than the tier 120b. In accordance with techniques herein, such data movement or relocation may be based on criteria including the workload or activity of the data portions and also the tier preference specified in 140. In this manner, the data storage optimizer may, for example, perform data movement optimizations to move or relocate data portions of LUN A based on the changing workload of such data portions. Such data portions may be moved between different ones of storage tiers 120a-120c having the SED attribute set thereby providing for storing the data of LUN A in encrypted form and also providing for data movement optimization based on changing data portion workloads. An exemplary illustration of where data portions may be relocated subsequent to the arrangement of FIG. 3A is now described in connection with FIG. 3B.

Figure 3B:
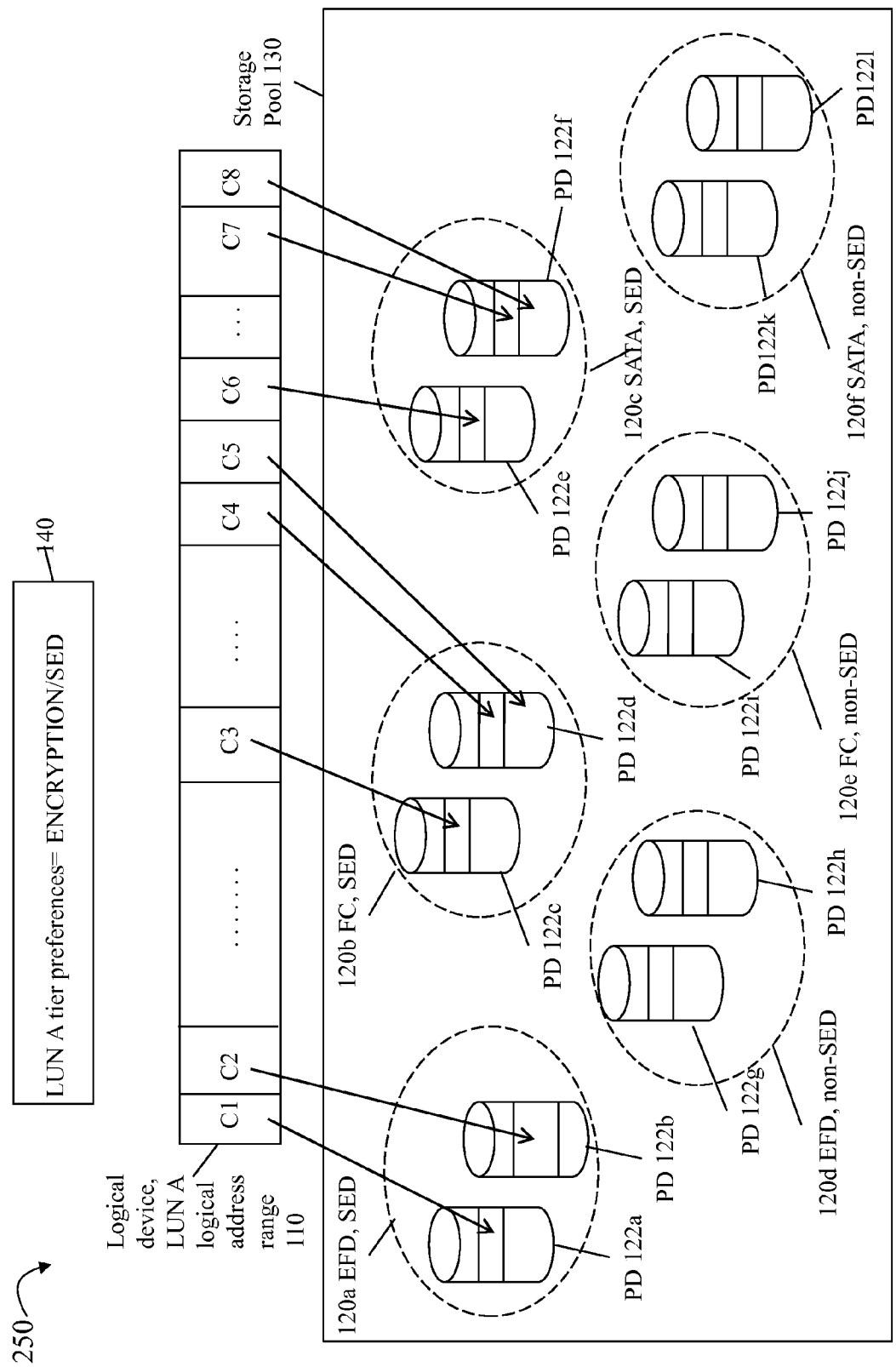

Referring to FIG. 3B, shown is an example 250 illustrating where some of the data portions of LUN A may be stored at a second point in time in accordance with the activity or workload of the data portions in an embodiment in accordance with techniques herein. FIG. 3B may represent a snapshot of where data portions of LUN A are stored subsequent to that as illustrated in FIG. 3A. In other words, the data storage optimizer may collect data regarding the activity or workload of the data portions of LUN A and accordingly relocate some of the data portions of LUN A as now illustrated in FIG. 3B. In this case due to the SED/ encryption tiering preference of 140, the data storage optimizer may locate the LUN A's data portions on any of the 3 storage tiers of SED (e.g., EFD-SED tier 120a, FC-SED tier 120b, SATA-SED tier 120c). In an embodiment in which the data storage optimizer performs automated data movement and placement of data portions based on activity level of the data portions, the data storage optimizer may move data portions of the LUN A between any of these three SED-based storage tiers 120a-c as the activity level of the data portions may change over time. In a similar manner if no encryption or non-SED is specified as a preferred property in 140 for storing data of the LUN, the data storage optimizer may then move data portions of the LUN between any of the three non SED-based storage tiers 120d-f as the activity level of the data portions may change over time.

With reference to FIG. 3B, consider selected portions C1-C8. Portions C1 and C2 may be very active and stored in PDs of tier 120a. Portions C6, C7 and C8 may have relatively little activity or workload (e.g., may be cold, relatively idle or inactive) in comparison to other portions C1-C5 and therefore portions C6-C8 may be stored in tier 120c. Portions C3, C4, and C5 may have a level of workload or activity greater than C6-C8 but also less than C1 and C2 and therefore portions C3-C5 may be stored in tier 120b.

In this manner, specifying SED or non-SED as a property preference for a LUN may indicate a first dimension of the physical devices upon which the data portions of the LUN may be located by the data storage optimizer. Other properties, such as drive type (e.g., SATA, EFD, FC), may serve as a second dimension of a lower priority. For example, as a variation to FIG. 3B, consider LUN A where property preferences indicate SED and also EFD. In this case, the data of the LUN may be located on any tier having the first dimensional property of SED and also the second dimensional property of EFD. If a second dimension property preference for a LUN is specified which identifies a drive type (e.g., SATA, EFD, FC), the combination of property preferences of both the first and second dimensions may be used to identify a prioritized list in which storage tiers are considered for storing the data portions of the LUN. The first dimension property of SED/encryption may be used as primary criteria when evaluating and selecting data movement alternatives, and the second dimension of EFD may be used as secondary criteria in combination with the primary criteria. Depending on the embodiment, the data storage optimizer may consider such property preferences in combination with activity level of the data portions, overall system performance, and/or other criteria when deciding where (e.g., in what storage tier(s)) to locate data portions of the LUN.

In an embodiment in accordance with techniques herein, the first dimensional property of SED may be used as first or primary criteria for performing data movement and location and the second dimensional property of drive technology or type may be used as a secondary ranking criteria for performing data movement and location. For example, there may be an insufficient amount of EFD SED available capacity in 120a to store all the data portions of LUN A. In this case, the optimizer may place all LUN A data portions on other SED-based tiers 120b, 120c in accordance with the primary criteria since there is sufficient available storage across the SED-based tiers 120a-c to store all of LUN A's data portions. The optimizer may also perform data placement of LUN A's data portions in accordance with the secondary criteria indicated by the EFD preference by placing the busiest or most active data portions of LUN A in tier 120a and then place any remaining data portions of LUN A in the next highest performance SED-based tier having available capacity, such as tier 120b. In this manner, the optimizer attempts data placement using the tiering preferences where such data placement first attempts to both primary and secondary criteria in connection with data placement. If both primary and secondary criteria cannot be satisfied, the optimizer attempts to satisfy the primary criteria (e.g., SED property) and then attempts to satisfy the secondary criteria (e.g., EFD property). Additionally, the optimizer may consider workload or activity of different data portions when determining which of the data portions to place in the different SED-based tiers 120a-c. For example, since there is insufficient available SED EFD storage capacity in tier 120a, the optimizer selects the data portions have the highest workload for storing in tier 120a and then stores any remaining portions in the next highest performing SED-based tier.

Figure 3C:
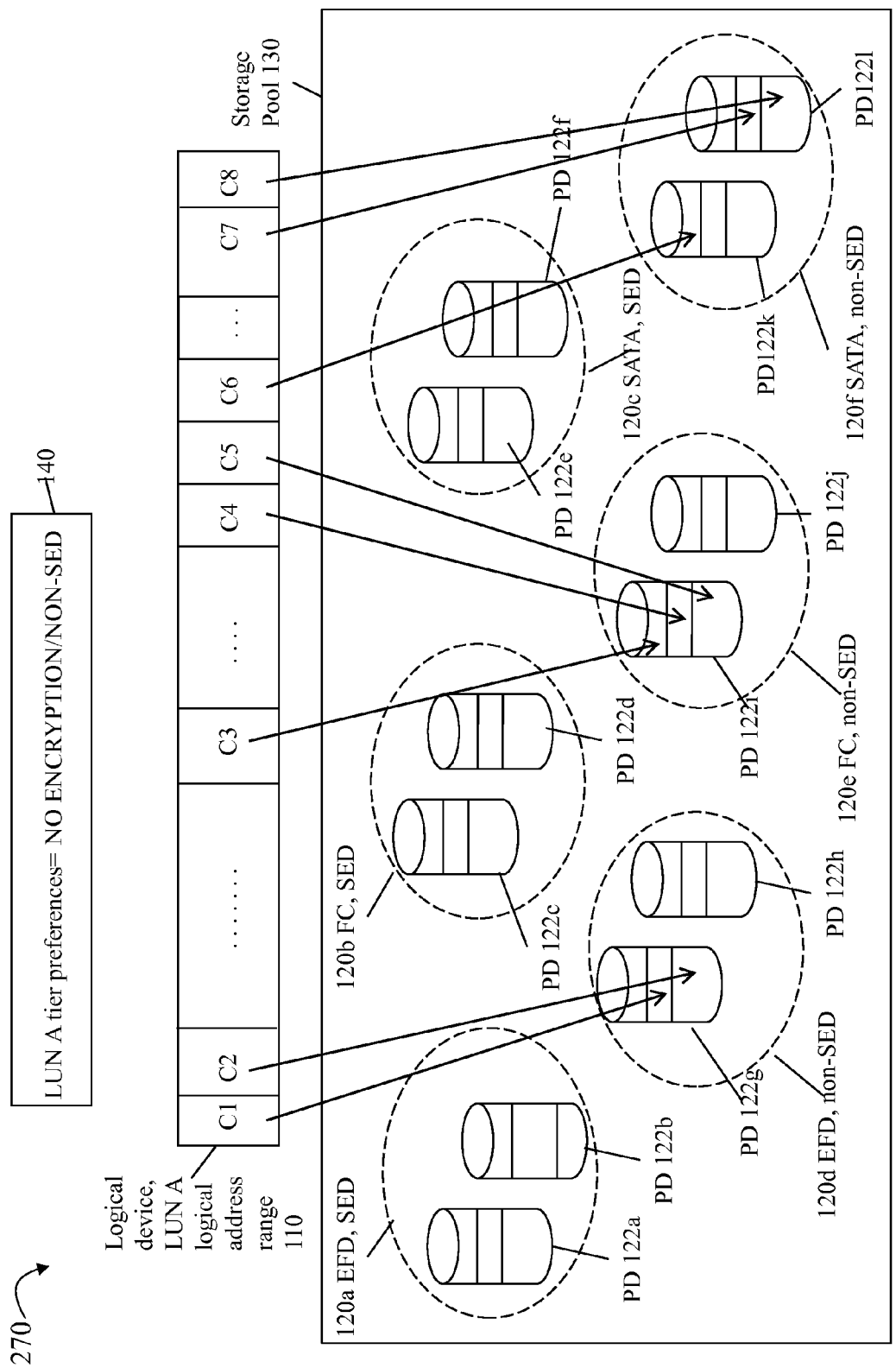

At a later third point in time, assume that data portions of LUN A become desensitized over time whereby it is no longer necessary to store LUN A's data on SED-based tiers. With reference now to FIG. 3C, the tiering preference 140 may be accordingly modified and set as illustrated to denote no encryption/non-SED. In this manner, setting the SED property as a preference may change over time and the data storage optimizer or other data movement module may accordingly relocate the data portions as the SED property setting for the LUN changes. The data storage optimizer may be used in one aspect to migrate data between SED-based storage tiers and non-SED based storage tiers over time based on the updated non-SED/no encryption property preference 140 for the LUN A as illustrated in the example 270 of FIG. 3C.

In response to modifying the tiering preference 140 from encryption/SED to no encryption/non-SED as in FIG. 3C (thereby indicating that data portions of LUN A are not stored in encrypted form and may be stored on non-SED storage tiers 120d-f), the data storage optimizer may perform data movements in accordance with the preferences 140 as data movement criteria. For purposes of simplicity in illustration, assume the workload or activity levels of the data portions C1-C8 remain approximately the same as in connection with FIGS. 3B. In this case, responsive to setting the preference to no encryption/non-SED as in FIG. 3C, the data storage optimizer may perform data movement to relocate data portions of LUN A from tiers as illustrated in FIG. 3B to other tiers as illustrated now in FIG. 3C. In particular, the optimizer may move the data portions C1 and C2 from tier 120a (as in FIG. 3B) to tier 120d (as in FIG. 3C), to move data portions C3-C5 from tier 120b (as in FIG. 3B) to tier 120e (as in FIG. 3C), and to move data portions C6-C8 from tier 120c (as in FIG. 3B) to tier 120f (as in FIG. 3C). In a similar manner as described above, the optimizer may perform further data movements of data portions of LUN A between storage tiers 120d-120f as the activity or workload of the data portions change over time.

At a fourth point in time, the tiering preference may once again be modified from no encryption/non-SED as in FIG. 3C to encryption/SED as described above in connection with FIG. 3B. In response to now further modifying the tiering preference 140 of FIG. 3C from no encryption/non-SED to encryption/SED (thereby indicating that data portions of LUN A are to be stored in encrypted form and may be stored on SED storage tiers 120a-c), the data storage optimizer may perform data movements in accordance with the updated preferences as data movement criteria. For purposes of simplicity in illustration, assume the workload or activity levels of the data portions C1-C8 remain approximately the same as in connection with FIG. 3C. In this case responsive to modifying the LUN A tiering preferences from no encryption/non-SED to encryption/SED, the data storage optimizer may perform data movements to return the state from FIG. 3C to that as illustrated in FIG. 3B by moving the data portions C1 and C2 from tier 120d to tier 120a, moving data portions C3-C5 from tier 120e to tier 120b, and moving data portions C6-C8 from tier 120f to tier 120c. In a similar manner as described above, the optimizer may perform further data movements of data portions of LUN A between storage tiers 120a-c as the activity or workload of the data portions change over time.

The foregoing illustrates how a non-encrypted LUN may be easily converted to an encrypted LUN, and vice versa (e.g., encrypted LUN converted to a non-encrypted LUN) by modifying the LUN's tiering preference. As the encryption preference changes, the optimizer may accordingly relocate data portions of the LUN to one or more tiers having the specified preference of SED/encryption or non-SED/no encryption depending on the tier preference setting.

In connection with techniques herein, an embodiment may have a LUN status or setting (also referred to herein as the encryption status indicator) denoting whether all the LUN's data is stored in encrypted form. For example, responsive to modifying the tiering preference from no encryption/non-SED to encryption/SED, the optimizer may relocate the data portions of the LUN to any one or more of the SED-based tiers 120a-c. Once such relocation or movement of LUN A's data has completed, the LUN's encryption status indicator may be accordingly set to denote that all LUNA's data is now stored on SED-based tiers, or more generally, stored in an encrypted form.

In some embodiments, initially, a data storage system may not have SED drives in the data storage system so that all data portions of all LUNs are stored on non-SED drives, or more generally, not stored in an encrypted form. The pool may not initially include any SED-based storage tiers when a LUN is created from the pool. At a later point in time, SED drives may be added to the data storage system and the configuration of the pool modified to also include one or more additional SED-based storage tiers of the SED drives added. In this case, the system may now include one or more SED-based tiers and also one or more non-SED-based tiers. For existing LUNs which have created prior to adding the SED-based tiers, a tier preference may be specified which indicates whether the LUN's data is to be stored on SED drives. In this case, the data storage optimizer may then migrate or relocate data of each such LUN having an SED tiering preference to an SED tier in a manner such as described above in connection with transitioning from a state of FIG. 3C to a state of FIG. 3B.

As a first generalization to the above description, tiering requirements and/or tiering preferences may be specified for each LUN. Tiering preferences are described above as preferred properties or attributes of a storage tier upon which to locate a LUN's data. In contrast, a tier requirement may denote a requirement rather than a preference whereby the data storage optimizer may be required to abide by the requirement in connection with data movements. For example, specifying a tiering requirement of SED or encryption may require the optimizer to store the associated LUN's data on an SED tier. Responsive to a violation of such requirements, an action may be taken such as, for example, the LUN's data may not be accessible for data operations until such requirement(s) are met. In connection with this first generalization, an attribute or property that may be specified as a tiering preference as described above may also be specified as a tiering requirement. The optimizer may view tiering requirements as having a higher priority than tiering preferences when evaluating different data movement options.

As described above, the tiering preferences and/or requirements may be specified at the per LUN or logical device level. As a second generalization in accordance with techniques herein, the tiering preferences and/or requirements may be specified at different and/or additional levels of granularities besides the per LUN or logical device level as noted above. An embodiment may more generally support different level(s) of granularity at which the tiering preference and/or requirements may be specified. For example, an embodiment may support a finer level of granularity at the sub-LUN level at which the tiering preferences and/or requirements may be specified. More generally, an embodiment may support one or more levels of granularities at which the tiering preference and/or requirement settings may be specified such as at the LUN level and/or the sub-LUN level (e.g. some portion of a LUN). For example, an embodiment may provide support for the tiering preferences and/or requirements at a level of granularity which is the same as the level of granularity used by the data storage optimizer for relocating data among different storage tiers.

In connection with techniques herein, triggers for setting or specifying tiering preferences or requirements may be manually specified such as by a user or may be specified automatically. For example, other software and/or hardware modules may automatically determine that selected data portions of a LUN, or all data of selected LUNs, should be stored on SED drives thereby automatically setting or modifying the SED tiering preference and/or requirement for a LUN or other supported level of granularity.

Referring to FIG. 4, shown is an example illustrating tiering preferences and status information that may be maintained per LUN in an embodiment in accordance with techniques herein supporting a LUN-level of granularity. The example 300 includes a table of LUNs and associated information. The table includes a first column of LUNs 310, a second column of tiering preferences 320, a third column of tiering requirements 330, and a fourth column of encryption status indicators 340. Each row in the table of 300 represents information for a single LUN.

Row 342 includes information for LUN A whereby EFD is indicated as a tiering preference and encryption/SED is indicated as a tiering requirement. Currently column 340 indicates an encryption status of "0" (zero) for LUN A denoting that LUN A's data is not fully encrypted. For example, it may be that the tiering requirement was just modified from no encryption/non-SED to encryption/SED as in FIG. 4 and the data movements to SED-based tiers are in progress, but not yet complete, to relocate LUN A's data portions from non-SED to SED-based tiers. Once such data movement has completed for all of LUN A's data to SED-based tier(s), the encryption status in column 340 may be accordingly updated to "1" (one) denoting that LUN A's data is fully encrypted. In connection with indicating SED as a requirement and EFD as a preference, the optimizer may first locate as many data portions of LUN A as possible in a storage tier meeting both the EFD preference and SED requirement. If there is insufficient storage in one or more such tiers for all LUN A's data, then the optimizer may locate any remaining data portions of LUN A on a storage tier that meets the SED requirement but not the EFD preference (e.g., tiers such as SED-based tiers 120b and 120c of FIG. 3A).

Row 344 includes information for LUN B whereby FC is indicated as a tiering preference and encryption/SED is indicated as a tiering requirement. Currently column 340 indicates an encryption status of 1 for LUN B denoting that LUN B's data is fully encrypted (e.g., all LUN B's data is stored on tiers having the encryption/SED attribute).

Row 346 includes information for LUN C whereby no encryption/non-SED is indicated as a tiering preference and EFD is indicated as a tiering requirement. Currently column 340 indicates an encryption status of 0 for LUN C denoting that LUN C's data is not fully encrypted. In connection with specifying EFD as a requirement and no encryption/non-SED as a preference, LUN C's data is required to be stored on EFD. As an example, consider the case with reference to FIG. 3A as described above having 6 storage tiers including an EFD, SED tier and an EFD, non-SED tier. The EFD non-SED tier may have insufficient available capacity to store all of LUN C's data so that any remaining data portions of LUN C's data may then be stored on the EFD, SED tier. In this manner, the tiering requirement may be characterized as a higher priority than the tiering preference as data movement criteria as may be used by the data storage optimizer or other component performing data movements in accordance with techniques herein.

Row 348 includes information for LUN D whereby EFD is indicated as a tiering requirement and encryption/SED is indicated as a tiering preference with the encryption status of 1 (denoting that all of LUN D's data is currently encrypted and stored in an encrypted/SED-based storage tier). In connection with specifying EFD as a requirement and encryption/SED as a preference, LUN D's data is required to be stored on EFD and preferred, but not required, to be encrypted. As an example, consider the case with reference to FIG. 3A as described above having 6 storage tiers including an EFD, SED tier and an EFD, non-SED tier. In this particular example, the EFD SED tier has sufficient capacity to store LUN D's data. However, as a variation, assume the EFD SED tier has insufficient available capacity to store all of LUN D's data so that any remaining data portions of LUN D's data may then be stored on the EFD, non SED tier. In this manner, the tiering requirement may be characterized as a higher priority than the tiering preference as data movement criteria as may be used by the data storage optimizer or other component performing data movements in accordance with techniques herein.

Setting SED as a tiering requirement may be used to ensure that encrypted data portions of a LUN are not moved to non-SED tiers and are stored in an encrypted form. Setting SED as a tiering preference indicates that it is preferred, although not required, to store data portions of an associated LUN in an encrypted form on an SED tier. With preferences, the optimizer will attempt to meet such preferences in combination with requirements and may give higher priority to data placement options which meet such preferences in combination with requirements over those which only meet requirements but not preferences. In this manner, preferences may be used as a lower level criteria in contrast to tiering requirements having a higher level of criteria used in connection with performing data movements.

As noted above, the information of FIG. 4 maintained at the LUN level of granularity may also be stored for other supported levels of granularity such as at the sub-LUN level. In this manner, an embodiment may provide for finer granularities of control for use in connection with storing data of LUNs.

For example, reference is now made to FIG. 5 showing information that may be used in an embodiment in accordance with techniques herein for a single LUN, LUN A. The information in the example 400 is similar to that as described in connection with FIG. 4 with the difference that FIG. 5 illustrates information for data portions of a single LUN A. It should be noted that similar information may be maintained for other data portions of other LUNs even though only a single LUN A's data portions are illustrated. Rows 442, 444 and 446 of FIG. 5 include information respectively analogous to rows 342, 344 and 346 of FIG. 4 as described above. However, as noted above, the example 400 provides such information for a sub-portion of a LUN rather than on a per-LUN basis (e.g., the tiering preferences and requirements and encryption status indicator are specified for a sub-portion of a LUN and its associated data). In this manner, providing a finer granularity of control for portions of a LUN allow for better use of SED-based and non-SED-based storage tiers in accordance with techniques herein.

An embodiment may provide one or more control mechanisms and associated parameters that may be used to affect the data movement from a non-SED tier to an SED tier. Such controls may be specified, for example, when initially setting the tiering preference or requirement for a LUN to indicate that the LUN's data should be stored on an SED tier. For example, a window of time may be specified within which this encryption is to be completed (when all data associated with the LUN is to be migrated from the non-SED tier to an SED tier). Generally, the smaller the specified window of time, the more aggressive and higher priority given to processing to that performs the foregoing data movement. As another example, an embodiment may allow for specifying a start time or an option to cause the data movement to start immediately. By default, processing to relocate data from the non-SED tier to the SED tier may be performed as a background task.

In an embodiment using SED-based storage tiers as described herein, efficient use of SED drives in a heterogeneous storage pool environment may provide increased flexibility in data storage environments.

Techniques described herein may be used in connection with specifying an option (e.g., tiering preference or requirement) for a LUN indicating whether data of the LUN is encrypted. The option may be specified when a user initially provisions storage for the LUN from a storage pool. Techniques herein also provide capability to change a LUN from a non-encrypted to an encrypted state seamlessly by simply modifying the setting of the option (e.g., modify a LUN's tiering requirement from no encryption/non-SED to encryption/SED). In the storage pool, SED drives may be mixed with other non-SED drives such as by adding a set of SEDs to an existing storage pool of regular non-SED devices. In an embodiment, the storage system may automatically configure such a pool using predefined policies so that SEDs are grouped into an encrypted storage tier, internally constructed using RAID Groups of SEDs. This encrypted storage tier included in a storage pool may provide encrypted data portions that can be allocated for LUNs of the pool. When the storage system creates a pool LUN with the SED/encryption tiering requirement, storage is allocated for data portions of the pool LUN only from the encryption tier(s) to fulfill the capacity allocation for the encrypted pool LUN. At the same time, the data storage optimizer may be used in an embodiment and recognize that these encrypted data portions having the SED/encryption tiering requirement set are different from those data portions allocated from non-SED drives. The data storage optimizer may not relocate these encrypted slices stored on SED-based tiers with a tiering requirement to other non-SED tiers (e.g., when SED/encryption is specified as a tiering requirement, relocation of such data portions may occur only between SED-based tiers). Based on this design, a non-encrypted LUN can easily be converted to an encrypted LUN by changing its tiering preference and/or requirement to encrypted/SED-based storage tier. Once the encryption preference or requirement is set, the data storage optimizer (or more generally data movement module) commences relocation of all non-encrypted slices to storage of an encrypted/SED-based tier. After the movement or relocation has completed, the LUN's encryption status indicator may be set or marked denoting the LUN's data as being fully encrypted.

Data movements may be performed by a data storage optimizer, or more generally, a data movement or relocation module, based on one or more data movement criteria. Such data movement criteria may include storage tiering preferences and/or requirements and also workload or activity of data portions.

Figure 6:
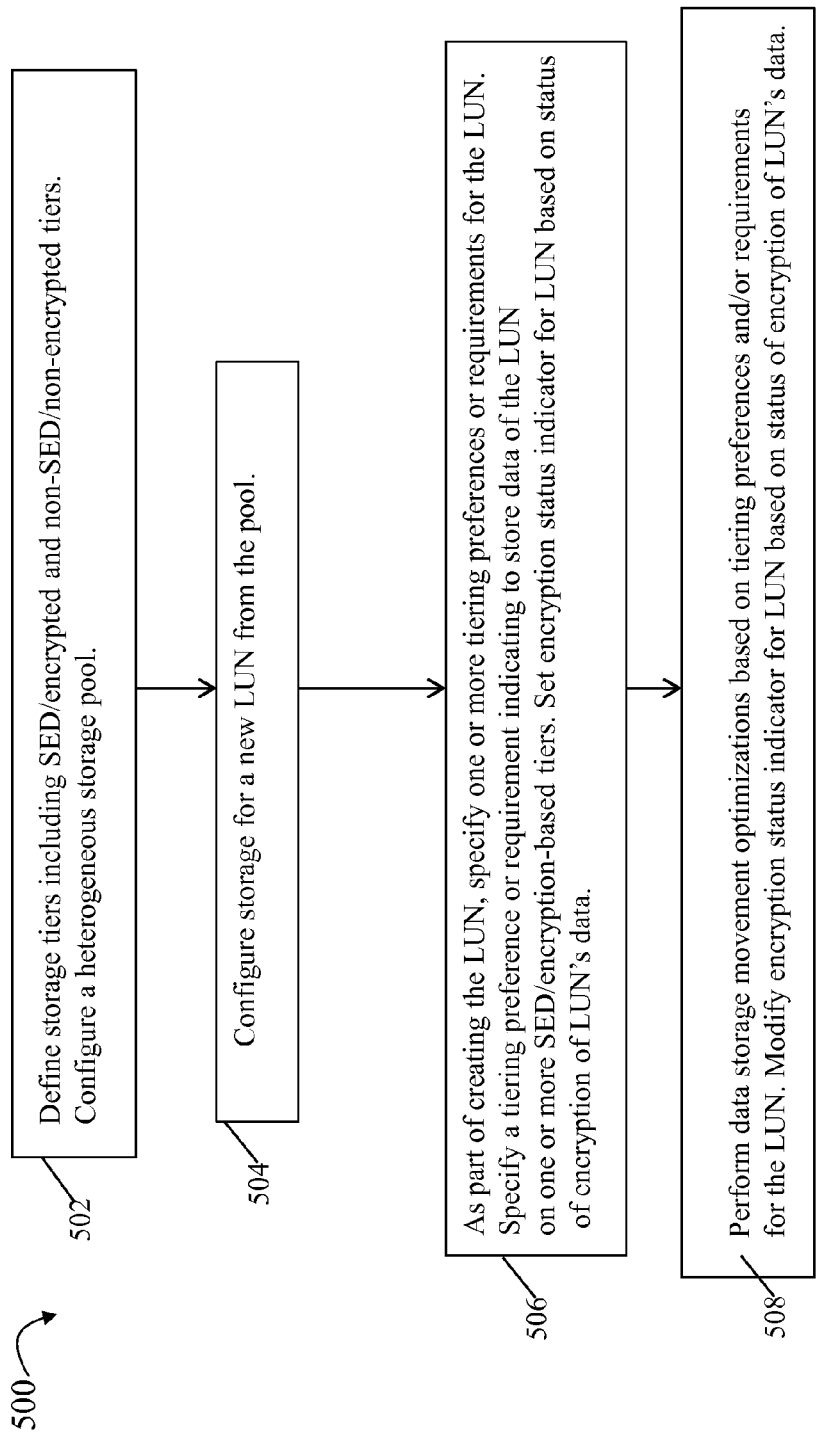
FIGS. 6-7 are flowcharts of processing steps that may be performed in an embodiment in accordance with techniques herein.
Figure 7:
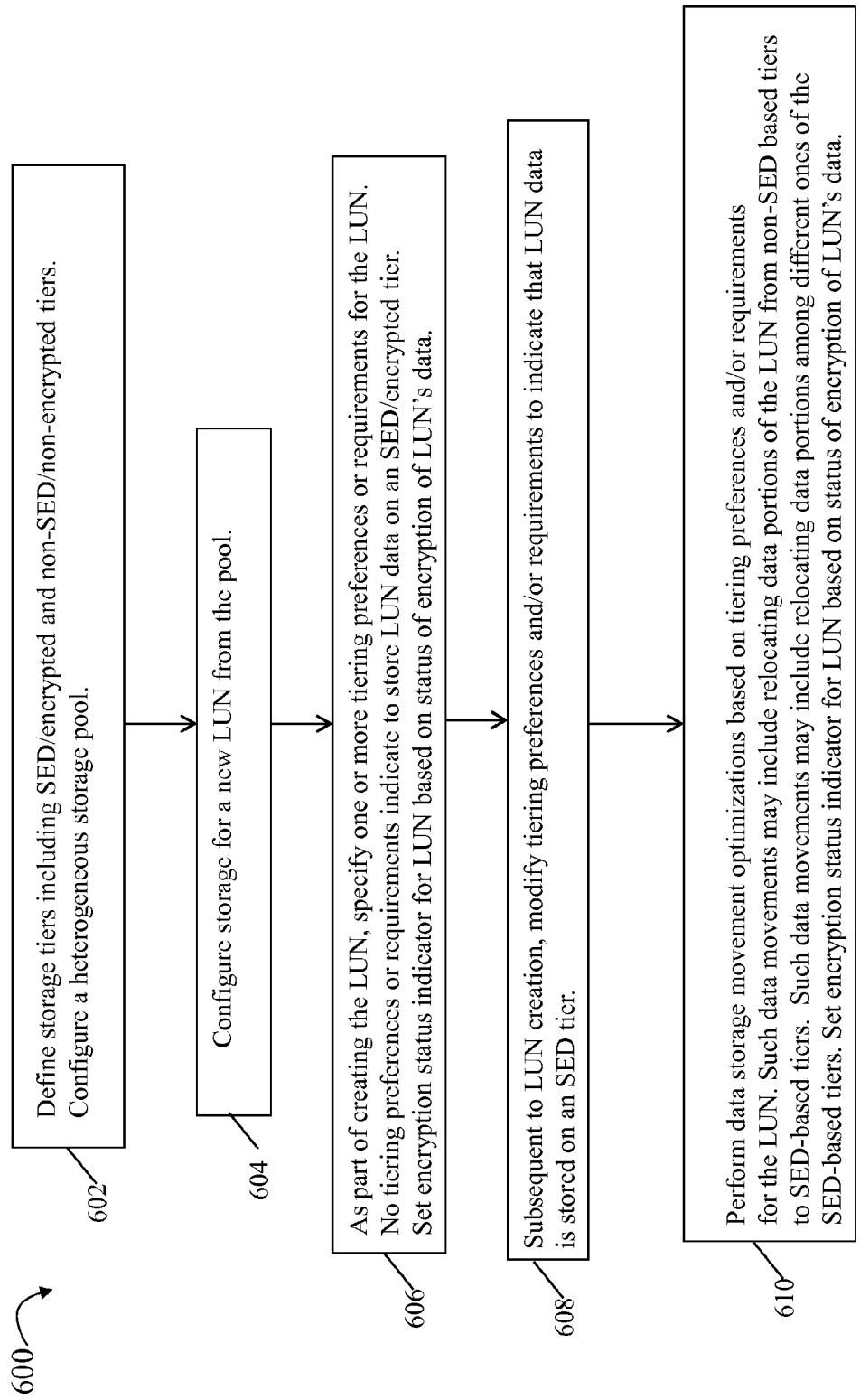

What will now be described are flowcharts in FIGS. 6 and 7 which summarize processing described above for use in connection with techniques herein having LUN-level granularity for tiering preferences and requirements. However, as will be appreciated by those skilled in the art and as noted above, such techniques and processing may be used in connection with other levels of granularity besides per-LUN. Also, processing in connection with FIGS. 6 and 7 are described with respect to a single LUN but may also be performed for multiple LUNs all having storage allocated from the same heterogeneous storage pool. In connection with a storage pool having storage allocated for multiple LUNs, the data storage optimizer may perform processing such as described herein for the combination of all data portions across all LUNs having storage allocated from the pool.

Referring to FIG. 6, shown is a first flowchart of processing steps that may be performed in an embodiment in accordance with techniques herein. The flowchart 500 summarizes processing as may be performed using techniques herein in connection with provisioning storage for a LUN. At step 502, one or more storage tiers may be defined which include SED/encrypted tiers and also non-SED/non-encrypted tiers. A storage pool may be configured which includes both SED/encrypted and non-SED/non-encrypted tiers. At step 504, a new LUN is configured from the pool. At step 506 as part of creating the LUN, one or more tiering preferences and/or requirements may be specified for the LUN. A tiering preference or requirement may be specified indicating to store data of the LUN on one or more encrypted/SED-based tiers. An encryption status indicator for the LUN is set based on the status of encryption of the LUN's data (e.g., whether all the LUN's data is stored in an encrypted form thereby having a status of 1, or otherwise thereby having an associated status of 0). At step 508, data storage movement optimizations may be performed based on tiering preferences and/or requirements of the LUN. For example, if a tiering requirement of encryption/SED is specified for the LUN, the data storage optimizer may perform data movement optimizations to relocate data portions of the LUN among different ones of the SED-based storage tiers of the pool based on the relative activity or workload of the data portions of the LUN. Step 508 may include modifying the encryption status indicator for the LUN over time in accordance with whether all the LUN's data is stored in an encrypted form at different points in time.

Referring to FIG. 7, shown is a second flowchart of processing steps that may be performed in an embodiment in accordance with techniques herein. The flowchart 600 summarizes processing as may be performed using techniques herein in connection with provisioning storage for LUN and then subsequently modifying tiering preferences and/or requirements. At step 602, one or more storage tiers may be defined which include SED/encrypted tiers and also non-SED/non-encrypted tiers. A storage pool may be configured which includes both SED/encrypted and non-SED/non-encrypted tiers. At step 604, a new LUN is configured from the pool. At step 606, as part of creating the LUN, one or more tiering preferences and/or requirements may be specified for the LUN. In this example, no tiering preferences or requirements may be initially specified which indicate to store LUN data on an SED/encrypted tier. The LUN's encryption status indicator may be accordingly set to indicate that all the data of the LUN is not stored in an encrypted form. At step 608, subsequent to LUN creation at a later point in time, a tiering preference and/or requirement may be modified to indicate that LUN data is stored on an SED-based tier (e.g., stored in an encrypted form). In step 610, the data storage movement optimizer may perform data movement optimizations based on tiering preferences and/or requirements for the LUN.

Such data movements may include relocating data portions of the LUN from non-SED-based tiers to SED-based tiers. Such data movements may also include relocating data portions among different ones of the SED-based tiers in accordance with the varying activity levels of the data portions at different points in time. It should be noted that an embodiment may perform such data movements as a background process to minimize any adverse impact on active I/Os to the LUNs. Step 608 may include modifying the LUN's encryption status indicator at various point in time depending on whether all data portions of the LUN are stored in an encrypted/SED-based tier or not based on the data movements performed.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of storing data comprising:
    providing a plurality of storage tiers including a first set of one or more storage tiers of physical devices and a second set of one or more storage tiers of physical devices, wherein data stored on any physical device in the first set is stored in an encrypted form and data stored on any physical device in the second set is not stored in an encrypted form;
    specifying a plurality of first settings for a plurality of data portions of a single logical device, wherein a logical address range of the single logical device is partitioned into the plurality of data portions and wherein each data portion of the plurality of data portions is associated with a portion of the logical address range and is associated with a different one of the plurality of first settings whereby said different one of the first settings is any of a tiering preference and tiering requirement having a value that indicates whether data of said each data portion is to be stored on one or more physical devices of a storage tier that stores data in an encrypted form;
    specifying a first value for a first one of the plurality of first settings that is any of a tiering preference and tiering requirement indicating that a first data portion of the single logical device is to be stored on one or more physical devices of a storage tier that stores data in an encrypted form; and
    responsive to specifying said first value as the first one of the plurality of first settings, relocating the first data portion of the single logical device currently stored on one or more physical devices of the second set to one or more physical devices of the first set.

2. The method of claim 1, wherein the storage devices of the first set are self encrypting drives providing for automatic encryption of data written to any of the physical devices of the first set and automatic decryption of data read from any of the physical devices of the first set.

3. The method of claim 1, further comprising:
    modifying the first one of the plurality of first settings from the first value to a second value indicating that the first data portion of the single logical device is to be stored on physical devices of a storage tier that does not store data in an encrypted form; and
    responsive to specifying said second value as the first setting, relocating the first data portion of the single logical device currently stored on one or more physical devices of the first set to one or more physical devices of the second set.

4. The method of claim 1, wherein the first set of storage tiers includes a first storage tier of physical devices and a third storage tier of physical devices, and wherein the second set includes a second storage tier of physical devices and a fourth storage tier of physical devices, and wherein the physical devices of the first storage tier are ranked as a higher performing than physical devices of the third storage tier and wherein the physical devices of the second storage tier are ranked as higher performing than physical devices of the fourth storage tier.

5. The method of claim 4, wherein a third value for a second setting is specified that is any of a tiering preference and tiering requirement indicating that the first data portion of the single logical device is to be stored on one or more physical devices of a storage tier having a particular physical drive type, said relocating selecting one or more storage tiers in the first set in accordance with said first value of the first one of the plurality of first settings and the third value of the second setting.

6. The method of claim 5, wherein responsive to specifying said first value for the first one of the plurality of first settings, said relocating relocates the first data portion of the single logical device currently stored on one or more physical devices of any of the second storage tier and the fourth storage tier to one or more physical devices included in any of the first storage tier and the third storage tier.

7. The method of claim 6, wherein said relocating moves, in accordance with current values of the plurality of first settings, a set of data portions of the single logical device, including the first data portion, to any of the first storage tier and the third storage tier wherein each of the data portions in the set is moved to a selected one of the first and third storage tiers in accordance with a current level of activity or workload associated with said each data portion and wherein each of the current values is set to said first value.

8. The method of claim 6, further comprising:
    modifying the first one of the plurality of settings from the first value to a second value indicating that the first data portion of the single logical device is to be stored on physical devices of a storage tier that does not store data in an encrypted form; and
    responsive to specifying said second value for the first one of the plurality of settings, relocating the first data portion of the single logical device currently stored on one or more physical devices of any of the first storage tier and the third storage tier to one or more physical devices of any of the second storage tier and the fourth storage tier.

9. The method of claim 7, wherein the first data portion and a second data portion of the single logical device are included in the set of data portions and are currently stored on one or more physical devices of the second storage tier, the first data portion of the single logical device has a higher level of activity than the second data portion of the single logical device, and wherein said relocating moves the first data portion to the first storage tier and the second data portion to the third storage tier.

10. The method of claim 9, wherein at a subsequent point in time the first data portion of the single logical device has a lower level of activity than the second data portion of the single logical device, and wherein, in accordance with the subsequent point in time, the first data portion is moved to the third storage tier and the second data portion is moved to the first storage tier as part of a data storage movement optimization.

11. The method of claim 1, wherein each of the plurality of storage tiers is associated with a set of one or more properties including a first property identifying whether physical devices of said each tier are self encrypting drives.

12. The method of claim 11, wherein the set of one or more properties includes a second property identifying a physical drive type.

13. The method of claim 1, wherein said relocating relocates a set of one or more data portions of the single logical device to one or more physical devices of the first set and wherein a status indicator is set to indicate that the set of one or more data portions are stored in an encrypted form responsive to completing relocation of the set of data portions to the first set of one or more storage tiers of physical devices.

14. The method of claim 1, wherein one or more control parameters are specified which affect any of a processing rate, amount of time and priority associated with performing said relocating.

15. A system comprising:
a plurality of storage tiers including a first set of one or more storage tiers of physical devices and a second set of one or more storage tiers of physical devices, wherein data stored on any physical device in the first set is stored in an encrypted form and data stored on any physical device in the second set is not stored in an encrypted form;
a logical device;
a plurality of first settings for a plurality of data portions of the logical device that is a single logical device, wherein a logical address range of the single logical device is partitioned into the plurality of data portions and wherein each data portion of the plurality of data portions is associated with a portion of the logical address range and is associated with a different one of the plurality of first settings whereby said different one of the first settings is any of a tiering preference and tiering requirement having a value that indicates whether data of said each data portion is to be stored on one or more physical devices of a storage tier that stores data in an encrypted form; and
a non-transitory computer readable medium comprising code stored thereon that, when executed, performs a method comprising:
specifying a first value for a first one of the plurality of first settings that is any of a tiering preference and tiering requirement indicating that a first data portion of the single logical device is to be stored on one or more physical devices of a storage tier that stores data in an encrypted form; and
responsive to specifying said first value as the first one of the plurality of first settings, executing code that relocates the first data portion of the single logical device currently stored on one or more physical devices of the second set to one or more physical devices of the first set and moves data of the single logical device between different ones of the plurality of tiers in accordance with criteria including said plurality of first settings for the plurality of data portions of the single logical device.

16. The system of claim 15, wherein the first data portion of the single logical device is associated with a second setting that is any of a tiering preference and a tiering requirement identifying a physical drive characteristic or type of physical drive, and wherein the criteria used by the data movement module includes the second setting.

17. The system of claim 15, further comprising code that performs data movement of the plurality of data portions of the single logical device among the plurality of storage tiers in accordance with criteria including the plurality of first settings for the plurality of data portions of said single logical device and workload or activity associated with each of the plurality of data portions of the single logical device.

18. A non-transitory computer readable medium comprising code stored thereon for storing data, the non-transitory computer readable medium comprising code stored thereon that, when executed, performs a method comprising:
providing a plurality of storage tiers including a first set of one or more storage tiers of physical devices and a second set of one or more storage tiers of physical devices, wherein data stored on any physical device in the first set is stored in an encrypted form and data stored on any physical device in the second set is not stored in an encrypted form;
specifying a plurality of first settings for a plurality of data portions of a single logical device, wherein a logical address range of the single logical device is partitioned into the plurality of data portions and wherein each data portion of the plurality of data portions is associated with a portion of the logical address range and is associated with a different one of the plurality of first settings whereby said different one of the first settings is any of a tiering preference and tiering requirement having a value that indicates whether data of said each data portion is to be stored on one or more physical devices of a storage tier that stores data in an encrypted form;
specifying a first value for a first one of the plurality of first settings that is any of a tiering preference and tiering requirement indicating that a first data portion of the single logical device is to be stored on one or more physical devices of a storage tier that stores data in an encrypted form; and
responsive to specifying said first value as the first one of the plurality of first settings, relocating the first data portion of the single logical device currently stored on one or more physical devices of the second set to one or more physical devices of the first set.

* * * * *